US008315824B2

United States Patent
Hirose

(10) Patent No.: US 8,315,824 B2
(45) Date of Patent: Nov. 20, 2012

(54) SYSTEM FOR DETECTING REMAINING QUANTITY IN LIQUID HYDROGEN TANK

(75) Inventor: Katsuhiko Hirose, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 141 days.

(21) Appl. No.: 12/083,941

(22) PCT Filed: Dec. 13, 2006

(86) PCT No.: PCT/JP2006/324844
§ 371 (c)(1),
(2), (4) Date: Apr. 22, 2008

(87) PCT Pub. No.: WO2007/069645
PCT Pub. Date: Jun. 21, 2007

(65) Prior Publication Data
US 2009/0119033 A1 May 7, 2009

(30) Foreign Application Priority Data

Dec. 14, 2005 (JP) ................................. 2005-360818

(51) Int. Cl.
*G01F 23/00* (2006.01)

(52) U.S. Cl. .......... 702/55; 702/138; 702/140; 702/156; 702/166; 73/295

(58) Field of Classification Search ............... 702/55, 702/138, 140, 156, 166; 73/295
See application file for complete search history.

(56) References Cited

U.S. PATENT DOCUMENTS

| 2,700,900 A | * | 2/1955 | Etienne ........................ 73/302 |
| 3,085,433 A | * | 4/1963 | Shmueli ....................... 73/295 |
| 3,221,551 A | | 12/1965 | Hogan et al. |
| 3,336,162 A | * | 8/1967 | Zachmann .................... 429/8 |
| 4,020,690 A | * | 5/1977 | Samuels et al. .............. 73/299 |

(Continued)

FOREIGN PATENT DOCUMENTS

JP 63-314418 12/1988

(Continued)

OTHER PUBLICATIONS

Bossel, "Efficiency of hydrogen fuel cell," Diesel-SOFC-Hybrid and Battery Electric Vehicles (2003).*

(Continued)

*Primary Examiner* — Jonathan C Teixeira Moffat
*Assistant Examiner* — Hyun Park
(74) *Attorney, Agent, or Firm* — Kenyon & Kenyon LLP

(57) ABSTRACT

The present invention relates to a system for detecting the remaining quantity of liquid hydrogen stored in a hydrogen storage device. In this system, the remaining quantity of liquid hydrogen is calculated accurately without being affected by the previous state in a tank. The internal pressure of the tank is detected. A fixed heat quantity is applied into the liquid hydrogen. The pressure in the tank after the application of heat quantity is detected. The volume of phase-transited hydrogen gas is calculated based on the heat quantity applied into the tank. The change amount of pressure in the tank before and after the application of heat quantity is calculated based on the pressure and the pressure. The remaining quantity of liquid hydrogen in the tank is calculated based on the volume of hydrogen gas and the change amount of pressure.

14 Claims, 8 Drawing Sheets

U.S. PATENT DOCUMENTS

| | | | |
|---|---|---|---|
| 4,852,054 A * | 7/1989 | Mastandrea | 702/51 |
| 4,956,996 A | 9/1990 | Morris | |
| 6,354,088 B1 * | 3/2002 | Emmer et al. | 62/50.1 |
| 6,519,951 B2 * | 2/2003 | Ovshinsky et al. | 62/46.2 |
| 6,776,038 B1 * | 8/2004 | Horton et al. | 73/299 |
| 7,434,407 B2 * | 10/2008 | Haberbusch et al. | 62/6 |
| 2002/0029770 A1 * | 3/2002 | Heffel et al. | 123/527 |
| 2003/0031970 A1 * | 2/2003 | Shimada et al. | 431/204 |
| 2004/0191585 A1 * | 9/2004 | Morita | 429/13 |

FOREIGN PATENT DOCUMENTS

| | | |
|---|---|---|
| JP | 05-223612 | 8/1993 |
| JP | 07-049254 | 2/1995 |
| JP | 2001-272266 A | 10/2001 |
| WO | WO 88/09484 | 12/1988 |
| WO | WO 02/16883 A2 | 2/2002 |
| WO | WO 2005/010427 A1 | 3/2005 |

OTHER PUBLICATIONS

"A student's guide to alternative fuel vehicles," California Energy Commision (2002).*

Edeskuty et al., "Safety in the handling of cryogenic fluids," Plenum Press, New York (1996).*

* cited by examiner (a) Before Heating (b) After Heating

SYSTEM FOR DETECTING REMAINING QUANTITY IN LIQUID HYDROGEN TANK

This is a 371 national phase application of PCT/JP2006/324844 filed 13 Dec. 2006, claiming priority to Japanese Patent Applications No. 2005-360818 filed 14 Dec. 2005, the contents of which are incorporated herein by reference.

TECHNICAL FIELD

The present invention relates to a hydrogen storage system suitable for vehicles, airplanes, ships, and the like using hydrogen as a fuel (hereinafter, referred to as "hydrogen fuel vehicles"). More particularly, it relates to a remaining quantity detecting system for detecting the remaining quantity of stored liquid hydrogen.

BACKGROUND ART

Conventionally, for example, Japanese Patent Laid-Open No. Hei5-223612 has disclosed a liquid gas remaining quantity managing device for calculating the remaining quantity in a liquid gas cylinder from the integrated flow quantity of gas. In this device, the flow quantity is always measured by a mass flow meter provided to a gas supply line. The measured flow quantity is added by an integrating meter, and the integrated quantity used is calculated, by which the remaining quantity of gas is managed.
Patent Document 1:
Japanese Patent Laid-Open No. Hei5-223612
Patent Document 2:
Japanese Patent Laid-Open No. Hei7-49254
Patent Document 3:
Japanese Patent Laid-Open No. 2001-272266

DISCLOSURE OF INVENTION

Problem to be Solved by the Invention

The atmospheric saturation temperature of liquid hydrogen is far lower than the atmospheric temperature (about −253° C.), so that a liquid hydrogen storage tank has a highly adiabatic construction. However, since the leakage of heat quantity from the outside air exists though in a minute amount, a phenomenon of phase transition of liquid hydrogen in the tank to a gas (boil off) takes place due to the influence of such heat quantity. As a result, the pressure in the tank rises, so that processing for reducing the pressure in the tank by appropriately discharging the gas in the tank (hereinafter, referred to as a "boil-off gas") is performed. Therefore, for example, in the case where liquid hydrogen is stored in the aforementioned device for calculating the remaining quantity from the integrated quantity used, an error corresponding to the boil-off gas is produced, so that the remaining quantity of liquid hydrogen cannot be detected accurately.

The present invention has been made to solve the above problem, and accordingly an object thereof is to provide a remaining quantity detecting system for calculating the remaining quantity of liquid hydrogen based on the heat quantity applied newly into a tank and the change in pressure in the tank before and after the application without being affected by the previous state in the tank.

Means for Solving the Problem

First aspect of the present invention is a system for detecting the remaining quantity of liquid hydrogen in a tank, comprising:

means for acquiring the change amount of heat quantity in the tank;

means for acquiring the change amount of pressure in the tank before and after the change in heat quantity in the tank; and means for calculating the remaining quantity of liquid hydrogen in the tank based on the change amount of heat quantity and the change amount of pressure.

Second aspect of the present invention is the system for detecting the remaining quantity of liquid hydrogen according to the first aspect, further comprising:

means for supplying hydrogen gas to the outside of the tank; and means for acquiring the supply amount of hydrogen gas supplied by the hydrogen gas supplying means, characterized in that the liquid hydrogen remaining quantity calculating means calculates the remaining quantity of liquid hydrogen in the tank based on the change amount of heat quantity, the change amount of pressure, and the supply amount of hydrogen gas.

Third aspect of the present invention is the system for detecting the remaining quantity of liquid hydrogen according to the second aspect, characterized in that the hydrogen gas supplying means supplies hydrogen gas to an output device which uses hydrogen as a fuel, and the hydrogen gas supply amount acquiring means estimates the supply amount of hydrogen gas based on the hydrogen consumption in the output device.

Fourth aspect of the present invention is the system for detecting the remaining quantity of liquid hydrogen according to the second aspect, characterized in that the hydrogen gas supplying means supplies hydrogen gas to a fuel cell which uses hydrogen as a fuel, and the hydrogen gas supply amount acquiring means estimates the supply amount of hydrogen gas based on the electricity generated by the fuel cell.

Fifth aspect of the present invention is the system for detecting the remaining quantity of liquid hydrogen according to any one of the first to the fourth aspects, characterized in that the tank includes means for heating liquid hydrogen therein, and the heat quantity change amount acquiring means acquires the heat quantity supplied by the heating means as the change amount of heat quantity.

Sixth aspect of the present invention is the system for detecting the remaining quantity of liquid hydrogen according to the fifth aspect, characterized in that the heating means is a heater arranged in the tank, and the heat quantity change amount acquiring means acquires the heating value of the heater as the change amount of heat quantity.

Seventh aspect of the present invention is the system for detecting the remaining quantity of liquid hydrogen according to any one of the first to the sixth aspects, characterized in that the heat quantity change amount acquiring means includes means for estimating the heat transfer amount from the outside to the inside of the tank and acquires the heat transfer amount as the change amount of heat quantity.

Eighth aspect of the present invention is the system for detecting the remaining quantity of liquid hydrogen according to the seventh aspect, further comprising means for acquiring the temperature difference between the inside and the outside of the tank, characterized in that the heat transfer amount estimating means estimates the heat transfer amount so as to be larger as the temperature difference increases.

Ninth aspect of the present invention is the system for detecting the remaining quantity of liquid hydrogen according to the eighth aspect, further comprising:

means for detecting that the quantity of liquid hydrogen in the tank has reached a specified quantity; and means for acquiring the change amount of pressure in the tank for a predetermined period of time in the case where the tank is filled with the specified quantity of liquid hydrogen, characterized in that the heat transfer amount estimating means estimates the heat transfer amount based on the specified quantity and the change amount of pressure in the case where the tank is filled with the specified quantity of liquid hydrogen.

Tenth aspect of the present invention is the system for detecting the remaining quantity of liquid hydrogen according to the ninth aspect, characterized in that the specified quantity is close to the full-fill quantity of the tank.

Eleventh aspect of the present invention is a method for detecting the remaining quantity of liquid hydrogen in a tank, comprising the steps of:

acquiring the change amount of heat quantity in the tank;

acquiring the change amount of pressure in the tank before and after the change in heat quantity in the tank; and calculating the remaining quantity of liquid hydrogen in the tank based on the change amount of heat quantity and the change amount of pressure.

Twelfth aspect of the present invention is the method for detecting the remaining quantity of liquid hydrogen according to the eleventh aspect, further comprising the steps of:

supplying hydrogen gas to the outside of the tank; and acquiring the supply amount of hydrogen gas supplied by the hydrogen gas supplying step, characterized in that the liquid hydrogen remaining quantity calculating step calculates the remaining quantity of liquid hydrogen in the tank based on the change amount of heat quantity, the change amount of pressure, and the supply amount of hydrogen gas.

Thirteenth aspect of the present invention is the method for detecting the remaining quantity of liquid hydrogen according to the eleventh or the twelfth aspect, characterized in that the heat quantity change amount acquiring step acquires the heat quantity supplied by heating liquid hydrogen in the tank as the heat quantity change amount.

Fourteenth aspect of the present invention is the method for detecting the remaining quantity of liquid hydrogen according to any one of the eleventh to the thirteenth aspects, characterized in that the heat quantity change amount acquiring step includes a step of estimating the heat transfer amount from the outside to the inside of the tank and acquires the heat transfer amount as the change amount of heat quantity.

Fifteenth aspect of the present invention is the method for detecting the remaining quantity of liquid hydrogen according to the fourteenth aspect, further comprising the steps of:

detecting that the quantity of liquid hydrogen in the tank has reached a specified quantity; and acquiring the change amount of pressure in the tank for a predetermined period of time in the case where the tank is filled with the specified quantity of liquid hydrogen, characterized in that the heat transfer amount estimating step estimates the heat transfer amount based on the specified quantity and the change amount of pressure in the case where the tank is filled with the specified quantity of liquid hydrogen.

Effects of the Invention

According to the first aspect of the present invention, the remaining quantity of liquid hydrogen in the tank can be calculated based on the change amount of heat quantity in the tank and the change amount of internal pressure of tank. The heat quantity entering into the tank is used as energy for phase-transiting the liquid hydrogen in the tank to a gas. Since the hydrogen gas phase-transited to a gas has a large volume, the internal pressure of tank takes a larger value than the value before phase transition. Therefore, according to the present invention, the remaining quantity of liquid hydrogen in the tank can be calculated accurately based on the change amount of heat quantity in the tank and a pressure difference before and after phase transition without being affected by the previous state in the tank.

According to the second aspect of the present invention, even during the time when hydrogen gas is supplied to the outside of tank, the remaining quantity of liquid hydrogen in the tank can be calculated based on the supply amount of hydrogen gas, the change amount of heat quantity in the tank, and the change amount of internal pressure of tank. Therefore, the remaining quantity of liquid hydrogen in the tank can always be calculated accurately.

According to the third or fourth aspect of the present invention, the hydrogen gas is supplied to the output device that uses hydrogen as a fuel, or a fuel cell, or the like. The supply amount of hydrogen gas can be estimated from the hydrogen consumption of the output device, which is a supply destination, or the electricity generated by a power generating device such as a fuel cell. Therefore, according to this invention, the quantity of hydrogen gas supplied to the outside of tank can be acquired accurately.

According to the fifth aspect of the present invention, by supplying heat intentionally into the tank by using the heating means, the heat quantity in the tank can be changed. Therefore, according to this invention, by using the supplied heat quantity as the change amount of heat quantity, the remaining quantity of liquid hydrogen in the tank can be calculated accurately without being affected by the previous state in the tank.

According to the sixth aspect of the present invention, heat is supplied into the tank intentionally by the heater. Therefore, according to this invention, the change amount of heat quantity in the tank can be acquired accurately based on the heating value of the heater.

According to the seventh or eighth aspect of the present invention, the heat quantity transferred from the outside of tank to the inside thereof is estimated, and the heat transfer amount is used as the change amount of heat quantity in the tank. Therefore, according to this invention, the change amount of heat quantity in the tank can be acquired accurately.

According to the ninth aspect of the present invention, the change amount of pressure in the tank for the predetermined period of time is acquired in the case where the tank is filled with the specified quantity of liquid hydrogen. The internal pressure of tank is changed by the transfer of heat from the outside of tank to the inside thereof. Therefore, according to this invention, the heat transfer amount can be estimated accurately based on the quantity of liquid hydrogen filled into the tank and the change amount of the internal pressure.

In particular, since the change in internal pressure of tank due to heat transfer increases as the gas volume in the tank decreases, a measurement error is less liable to occur. According to the tenth aspect of the present invention, since the

Figure 1:
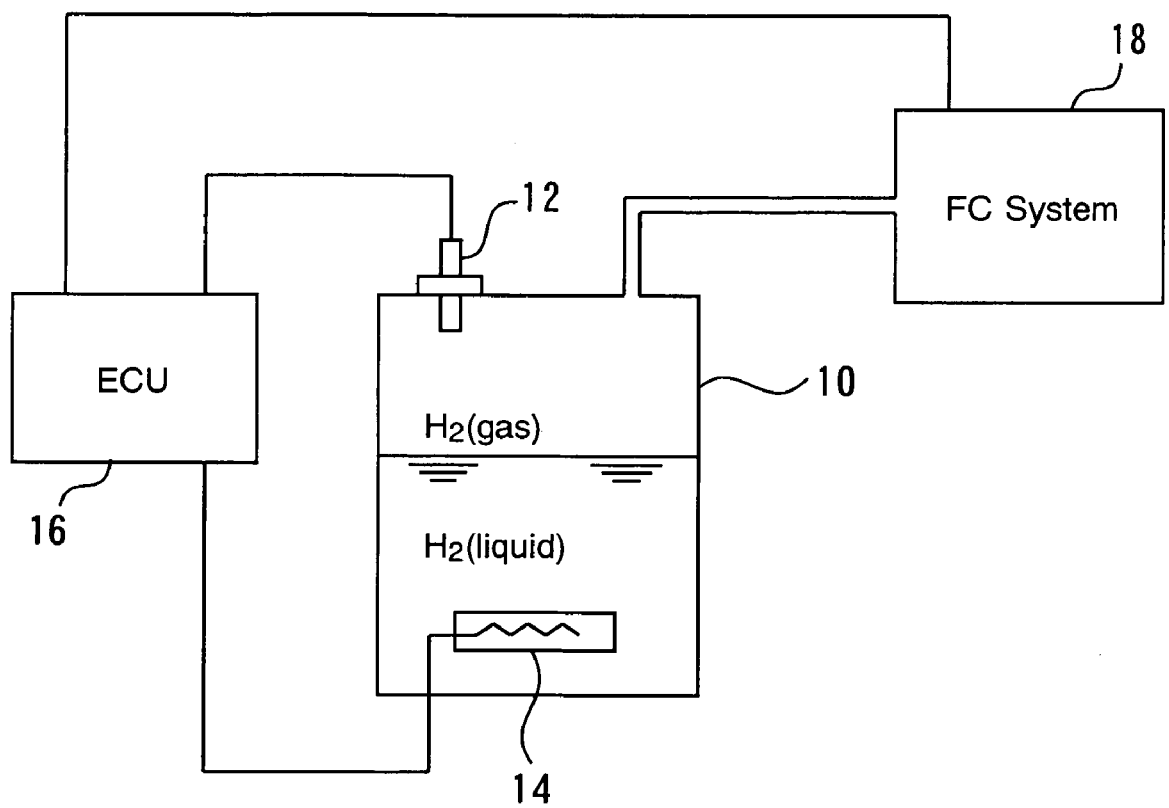
FIG. 1 is a schematic diagram showing the configuration related to the first embodiment of the present invention.

DESCRIPTION OF REFERENCE CHARACTERS 10 hydrogen tank
12 pressure sensor
14 heater
16 ECU (Electronic Control Unit)
18 fuel cell (FC) system
$V_L$ volume of liquid hydrogen
Vt tank volume
Ve volume phase-transited to a gas
E applied heat quantity
$E_L$ leaking heat quantity
Eg evaporation latent heat of hydrogen
R gas constant

BEST MODE FOR CARRYING OUT THE INVENTION

First Embodiment

Hardware Configuration of First Embodiment

FIG. 1 shows a configuration of a system for detecting remaining quality in a liquid hydrogen tank, which system is used in a first embodiment of the present invention. As shown in FIG. 1, the system of this embodiment has a hydrogen tank 10. The hydrogen tank 10, which is a hydrogen supply tank for mainly storing liquid hydrogen, has a adiabatic construction so that the generation of boil-off gas due to the leakage of heat quantity can be restrained.

The hydrogen tank 10 is provided with a pressure sensor 12, so that the pressure in the tank can be detected. Also, in the hydrogen tank 10, a heater 14 for applying heat quantity is provided.

The system of this embodiment is provided with an electronic control unit (ECU) 16 as shown in FIG. 1. The output of the aforementioned pressure sensor 12 is supplied to the ECU 16, and the ECU 16 calculates the change amount of pressure at predetermined time based on the output. Also, the ECU 16 is connected with the heater 14 so as to drive the heater 14 and calculate the heat quantity supplied into the tank. The ECU 16 performs processing for calculating the remaining quantity of liquid gas based on these pieces of information.

The hydrogen gas in the hydrogen tank 10 is supplied to a fuel cell (FC) system 18. The FC system 18 is connected to the ECU 16 so as to supply the operation state etc. of the system to the ECU 16. The ECU 16 performs processing for calculating the supply amount of hydrogen gas based on this signal.

Operation of First Embodiment

Figure 2:
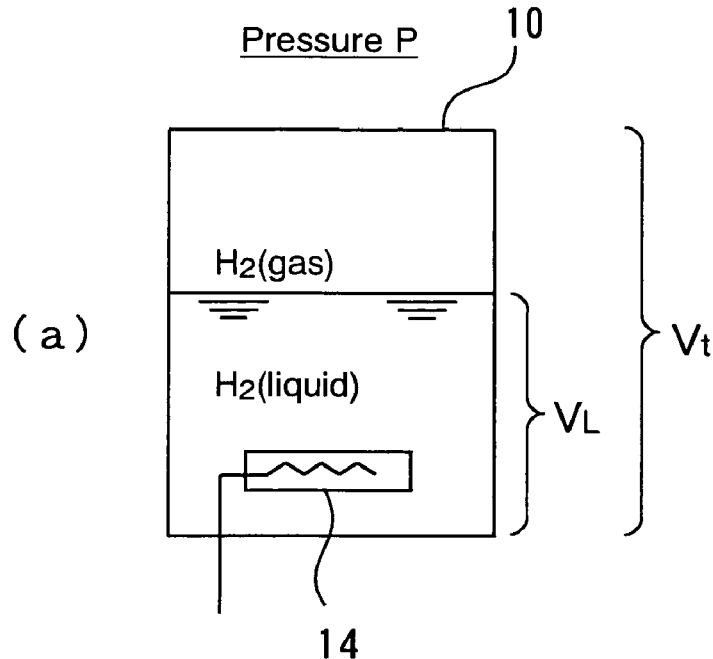
FIG. 2 is a schematic view showing the operation principle of the system for detecting remaining quality in a liquid hydrogen tank related to the first embodiment of the present invention.
Figure 2:
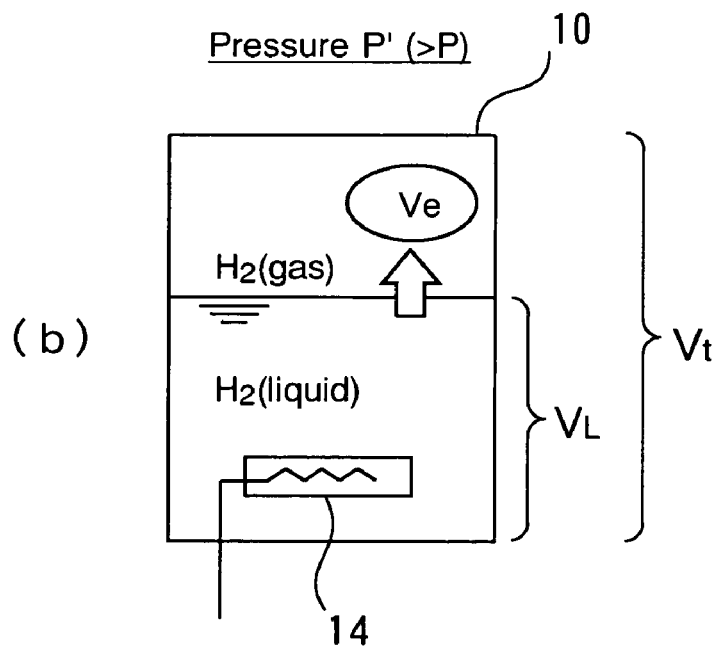

Next, the operation principle of this embodiment is explained with reference to FIG. 2. The system of this embodiment can calculate the remaining quantity of liquid hydrogen accurately based on the heat quantity supplied into the tank by the heater 14 and the change amount of pressure in the tank before and after the supply.

FIG. 2(a) is a schematic view showing a state in the tank before the heat quantity is applied into the hydrogen tank. According to this figure, liquid hydrogen and hydrogen gas are present in the tank, and an equilibrium state is kept at an inside pressure P and a temperature T. The interior of the tank is controlled so that a temperature not higher than the boiling point is always kept by the publicly known method to prevent the liquid hydrogen from gasifying. When the tank volume is taken as Vt and the volume of liquid hydrogen is taken as $V_L$, the volume of hydrogen gas in the tank can be expressed as $Vt-V_L$.

FIG. 2(b) shows a state in the tank in the case where the heater 14 is driven by the ECU 16 to apply heat quantity into the tank. According to this figure, when the applied heat quantity (energy) is taken as E, and the evaporation latent heat of hydrogen is taken as Eg, liquid hydrogen corresponding to E/Eg (mass) phase-transits to a gas. In this connection, the evaporation latent heat means the heat quantity (energy) necessary for the phase transition of a substance of unit quantity to a gas. When the volume phase-transited to a gas is taken as Ve, since Ve is several hundred times of the volume of liquid, the internal pressure P' of the tank becomes higher than the pressure P. If the temperature T in the tank is assumed to be constant before and after the change, and the equation of state of ideal gas is applied approximately, the following equation holds.

$$P \times (Vt - V_L + Ve) = P' \times (Vt - V_L) \quad (1)$$

If Equation (1) is reduced taking the change amount (P'−P) of pressure as $\Delta P$, the following equation holds.

$$V_L = Vt - (Ve \times P/\Delta P) \quad (2)$$

Similarly, if the equation of state of ideal gas is applied approximately, the volume Ve phase-transited to a gas is expressed by the following equation.

$$Ve = E/Eg \times (RT/P) \quad (3)$$

wherein, T is temperature in the tank, and R is gas constant.

As described above, in this embodiment, the tank volume Vt, the volume Ve of newly generated hydrogen gas, the internal pressure P of the tank before the heat quantity is applied, and the pressure difference $\Delta P$ can be calculated. By substituting these values into Equation (2), the volume $V_L$ of liquid gas in the tank can be calculated accurately.

Specific Processing in First Embodiment

Figure 3:
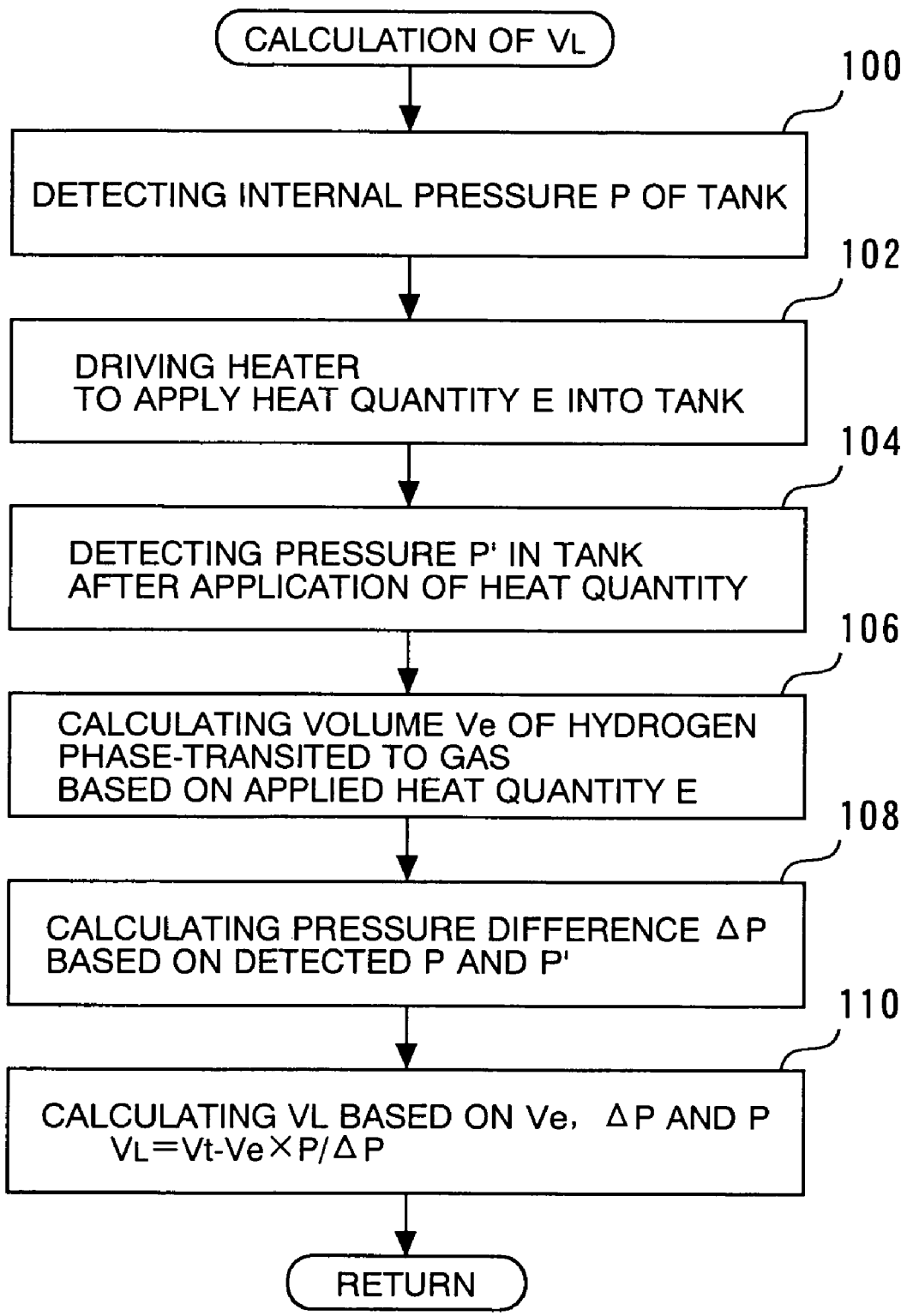
FIG. 3 is a flowchart for a routine executed by the system according to the first embodiment.

FIG. 3 is a flowchart for a routine executed by the ECU 16 to calculate the remaining quantity of liquid hydrogen in the tank. In the routine shown in FIG. 3, first, the internal pressure P of the tank is detected by the pressure sensor 12 provided in the tank 10 (Step 100). The detected output signal is supplied to the ECU 16.

Next, in the routine shown in FIG. 3, the heater 14 provided in the tank 10 is driven by the ECU 16 to apply a predetermined heat quantity E into the liquid hydrogen (Step 102). When a heat quantity E is applied, the internal pressure of the tank increases to phase-transit some of the liquid hydrogen to a gas. The pressure sensor 12 detects the pressure P' (Step 104). The detected output signal is supplied to the ECU 16.

Next, the volume Ve of phase-transited hydrogen gas is calculated based on the heat quantity E, which is applied into the tank, by the ECU 16 (Step 106). Specifically, first, the evaporation latent heat Eg is specified. The evaporation latent heat Eg is a value that changes according to the pressure. The ECU 16 stores a map in which the relationship between the evaporation latent heat Eg and the pressure is specified. In this routine, by using this map, the evaporation latent heat Eg corresponding to the internal pressure of tank supplied by the pressure sensor 12 is specified. Then, based on the applied heat quantity E and the evaporation latent heat Eg, the mass (E/Eg) of hydrogen phase-transited to a gas is calculated. Based on Equation (3), the volume Ve of hydrogen gas corresponding to this hydrogen mass is specified.

Next, the change amount $\Delta P$ of pressure in the tank before and after the application of heat quantity is calculated by the ECU 16 (Step 108). Specifically, the change amount $\Delta P$ is calculated based on the pressure signal before the application of heat quantity, which is detected in Step 100, and the pressure signal after the application of heat quantity, which is detected in Step 104.

After the processing in the above-described steps has been finished, the remaining quantity $V_L$ of liquid hydrogen in the tank is calculated (Step 110). Specifically, P detected in Step 100, Ve calculated in Step 106, and $\Delta P$ calculated in Step 108 are substituted into Equation (2), by which the remaining quantity $V_L$ of liquid hydrogen in the tank is calculated.

As explained above, according to this embodiment, the remaining quantity $V_L$ of liquid hydrogen in the tank is calculated based on the heat quantity applied into the tank and the change amount of pressure in the tank before and after the application. Therefore, the remaining quantity of liquid hydrogen can always be calculated accurately without being affected by the previous state in the tank.

In the above-described first embodiment, the pressure sensor 12 is installed directly on the tank 10. However, the installation location of the pressure sensor 12 is not limited to this location. In order to prevent heat from entering into the tank 10 as far as possible, the configuration may be such that a pipe is extended from the tank 10 and the pressure sensor 12 is installed at a location separate from the tank 10 to increase the adiabatic effect of tank.

In the above-described first embodiment, the "heat quantity change amount acquiring means" in the first invention is realized by the execution of processing in Step 102 using the ECU 16, the "pressure change amount acquiring means" in the first invention is realized by the execution of processing in Step 108 using the ECU 16, and the "liquid hydrogen remaining quantity calculating means" in the first invention is realized by the execution of processing in Step 110 using the ECU 16.

Also, in the above-described first embodiment, the "heating means" in the fifth invention is realized by the driving of the heater 14 in Step 102 using the ECU 16.

Further, in the above-described first embodiment, the applied heat quantity E corresponds to the "heating value" in the sixth invention.

Second Embodiment

Feature of Second Embodiment

Figure 4:
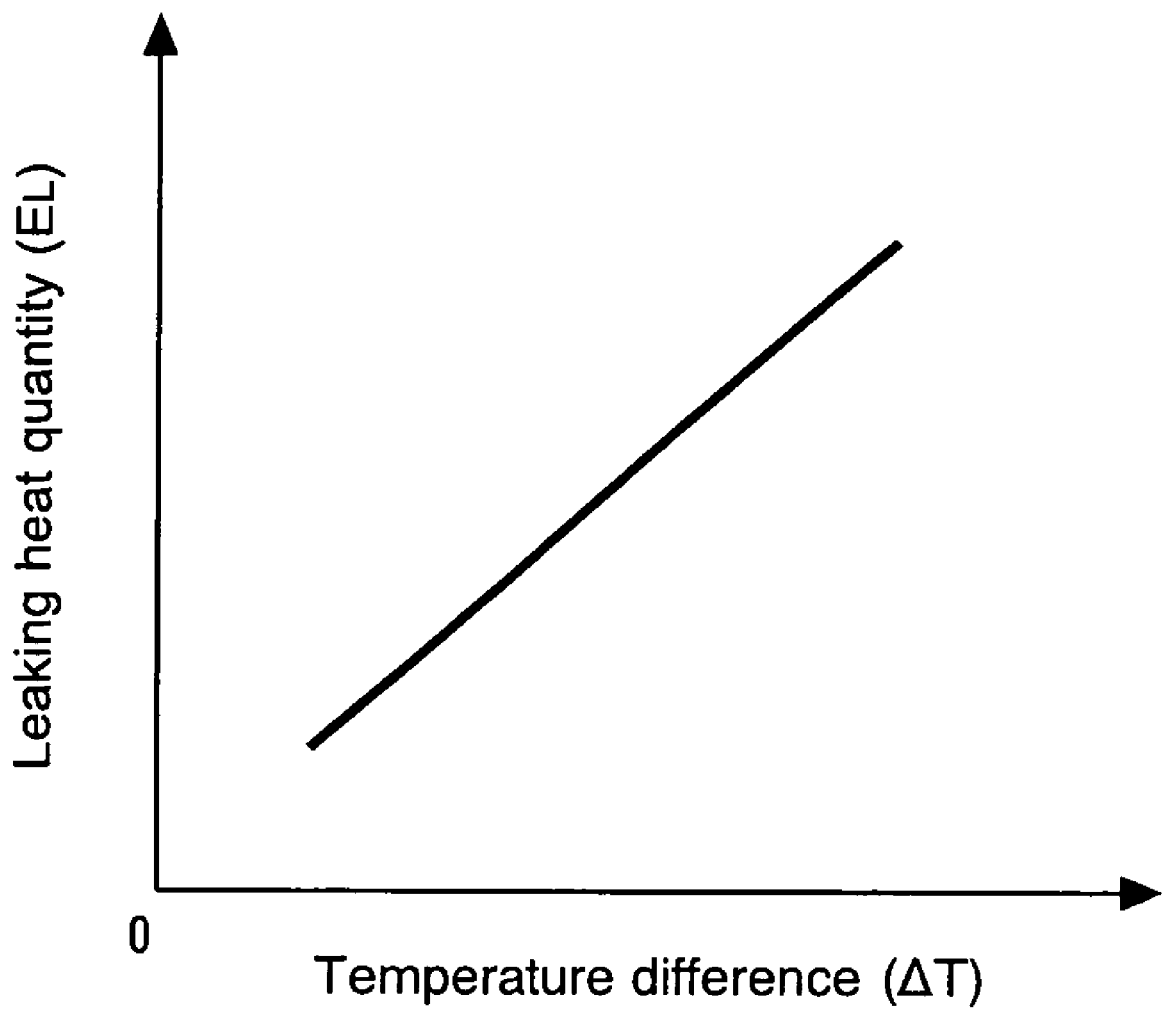
FIG. 4 is a graph showing the relationship between the leaking heat quantity $E_L$ and the temperature difference $\Delta T$ between the temperature in the tank and the temperature of the outside air.

Next, a second embodiment of the present invention is explained with reference to FIGS. 4 and 5. The system of this embodiment can be realized by the execution of the routine, described later, shown in FIG. 5 using the ECU 16 by using the hardware configuration shown in FIG. 1.

In the above-described first embodiment, heat quantity is intentionally applied into the tank by driving the heater, and the remaining quantity $V_L$ of liquid hydrogen is calculated based on the change amount of pressure in the tank before and after the application. Although the tank 10 has a highly adiabatic construction as described above, a minute heat quantity always leaks from the outside of tank into the inside thereof. Therefore, if the leaking heat quantity can be estimated, the leaking heat quantity can be used for calculating the remaining quantity $V_L$ of liquid hydrogen in place of the heat quantity applied by the heater.

The adiabatic performance exerts an influence on the shape of tank. Also, as shown in FIG. 4, even if the shape of tank is the same, as the temperature difference between the temperature in the tank and the temperature of the outside air increases, the leaking heat quantity takes a larger value. Therefore, by reflecting the temperature difference in the leaking heat quantity specified by the tank shape, the leaking heat quantity can be estimated with high accuracy. In this embodiment, the remaining quantity $V_L$ of liquid hydrogen is calculated based on the leaking heat quantity. Thereby, even if the heater is not driven intentionally, the remaining quantity $V_L$ of liquid hydrogen can be calculated accurately.

Hereunder, a procedure for the system of this embodiment to calculate the remaining quantity $V_L$ of liquid hydrogen based on the above-described method is explained specifically.

Figure 5:
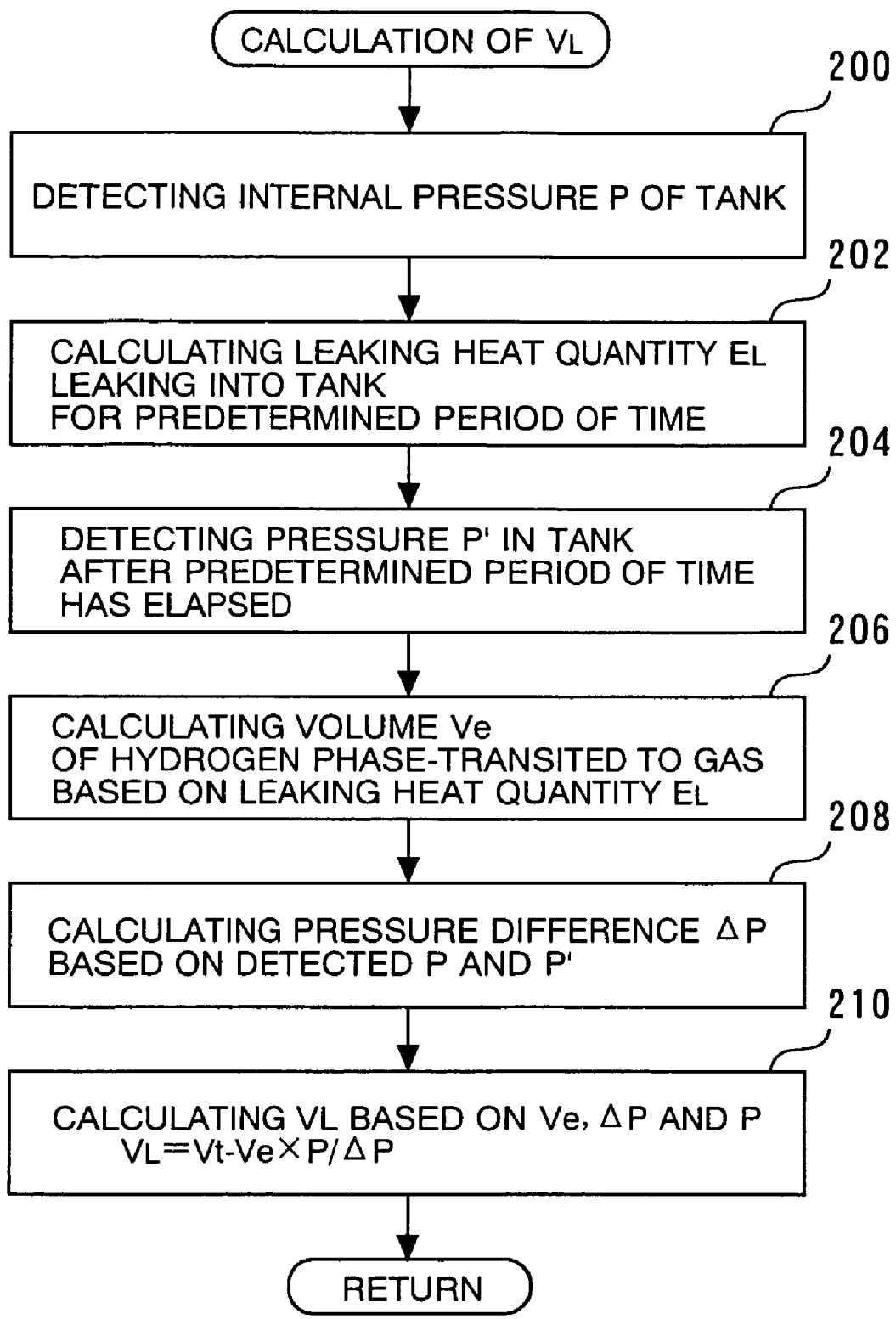
FIG. 5 is a flowchart for a routine executed by the system according to the second embodiment.

FIG. 5 is a flowchart for a routine executed by the ECU 16 to calculate the remaining quantity of liquid hydrogen in the tank. In the routine shown in FIG. 5, first, the internal pressure P of the tank is detected by the pressure sensor 12 provided in the tank 10 (Step 200). The detected output signal is supplied to the ECU 16.

Next, in the routine shown in FIG. 5, a leaking heat quantity $E_L$ leaking into the tank 10 is estimated by the ECU 16 (Step 202). Specifically, first, the reference leaking heat quantity is read. This reference leaking heat quantity is a value specified based on the tank shape. Next, a temperature difference $\Delta T$ between the temperature in the tank and the temperature of the outside air is calculated. This temperature difference can be calculated based on the outside air temperature signal of FC system 18, which is supplied to the ECU 16. The actual leaking heat quantity is a value that changes according to the magnitude of the temperature difference $\Delta T$. The ECU 16 stores a map in which the relationship between the temperature difference $\Delta T$ and the leaking heat quantity is specified. In this routine, by using this map, the leaking heat quantity corresponding to $\Delta T$ is specified. Then, the leaking heat quantity $E_L$ for a predetermined period of time is calculated by the ECU 16.

Next, when the leaking heat quantity $E_L$ enters into the tank, some of the liquid hydrogen is phase-transited to a gas, so that the internal pressure of the tank increases. The pressure sensor 12 detects this pressure P' (Step 204). The detected output signal is supplied to the ECU 16.

After the processing in the above-described steps has been finished, the volume Ve of newly gasified hydrogen is calculated based on the leaking heat quantity $E_L$ by the ECU (Step 206). Then, the change amount ΔP of pressure in the tank before and after the application of heat quantity is calculated (Step 208), and the remaining quantity $V_L$ Of liquid hydrogen in the tank is calculated (Step 210). In Steps 206 through 210, specifically, the processing that is the same as that in Steps 106 through 110 shown in FIG. 3 is executed.

As explained above, according to this embodiment, the remaining quantity $V_L$ of liquid hydrogen in the tank is calculated based on the leaking heat quantity $E_L$ leaking naturally from the outside of tank into the inside thereof and the change amount of pressure in the tank before and after the application. Therefore, the remaining quantity of liquid hydrogen can always be calculated accurately without a need for applying heat quantity from an external heat source such as a heater and without being affected by the previous state in the tank.

In the above-described second embodiment, the remaining quantity $V_L$ of liquid hydrogen is calculated based on the amount of change in pressure in the tank caused by the influence of the leaking heat quantity $E_L$ only. However, the heat quantity used is not limited to the leaking heat quantity $E_L$ only. That is to say, the application of heat quantity E by means of driving of the heater shown in the first embodiment is performed at the same time, and this heat quantity may be used to calculate the remaining quantity of liquid hydrogen based on the change amount of pressure corresponding to the total heat quantity applied into the tank.

In the above-described second embodiment, the "pressure change amount acquiring means" in the first invention is realized by the execution of processing in Step 208 using the ECU 16, and the "liquid hydrogen remaining quantity calculating means" in the first invention is realized by the execution of processing in Step 210 using the ECU 16.

Also, in the above-described second embodiment, the leaking heat quantity $E_L$ corresponds to the "heat transfer amount" in the seventh invention, and the "heat transfer amount estimating means" in the seventh invention is realized by the execution of processing in Step 202 using the ECU 16.

Also, in the above-described second embodiment, the "temperature difference acquiring means" in the eighth invention is realized by the calculation of the temperature difference ΔT between the temperature in the tank and the temperature of the outside air in Step 202 using the ECU 16.

Third Embodiment

Feature of Third Embodiment

Next, a third embodiment of the present invention is explained with reference to FIG. 6. The system of this embodiment can be realized by the execution of the routine, described later, shown in FIG. 6 using the ECU 16 by using the hardware configuration shown in FIG. 1.

In the state in which the FC system 18 is operated, hydrogen gas is supplied at all times from this system to the FC system 18. To the ECU 16, information such as the electricity generated by the FC system is supplied, and the volume Vout of hydrogen gas to be supplied based on this signal is calculated. A heat quantity Eout necessary for generating hydrogen gas of Vout is calculated, and heater control is carried out based on the calculated value.

That is to say, during the operation of the FC system, the volume of the supplied hydrogen gas is always monitored by the ECU 16. Therefore, even in the case where the heat quantity for detecting the remaining quantity of liquid shown in the first embodiment is further applied into the tank in addition to the aforementioned Eout during the operation of the FC system, the volume of hydrogen gas based on this heat quantity can be calculated by subtracting Vout from the volume of hydrogen gas phase-transited to a gas based on the total heat quantity. Therefore, even during the operation of the FC system, the remaining quantity of liquid hydrogen can always be calculated accurately.

In the above-described first and second embodiments, the volume of hydrogen gas supplied to the outside of tank is not considered when the remaining quantity of liquid hydrogen is calculated. Therefore, during the operation of the FC system, an error corresponding to the volume Vout of the supplied hydrogen gas is produced. For this reason, in the methods shown in the above-described first and second embodiments, in order to calculate the remaining quantity $V_L$ of liquid hydrogen, the case where the FC system 18 is not operated is suitable.

Hereunder, a procedure for the system of this embodiment to calculate the remaining quantity $V_L$ of liquid hydrogen based on the above-described method is explained specifically.

Figure 6:
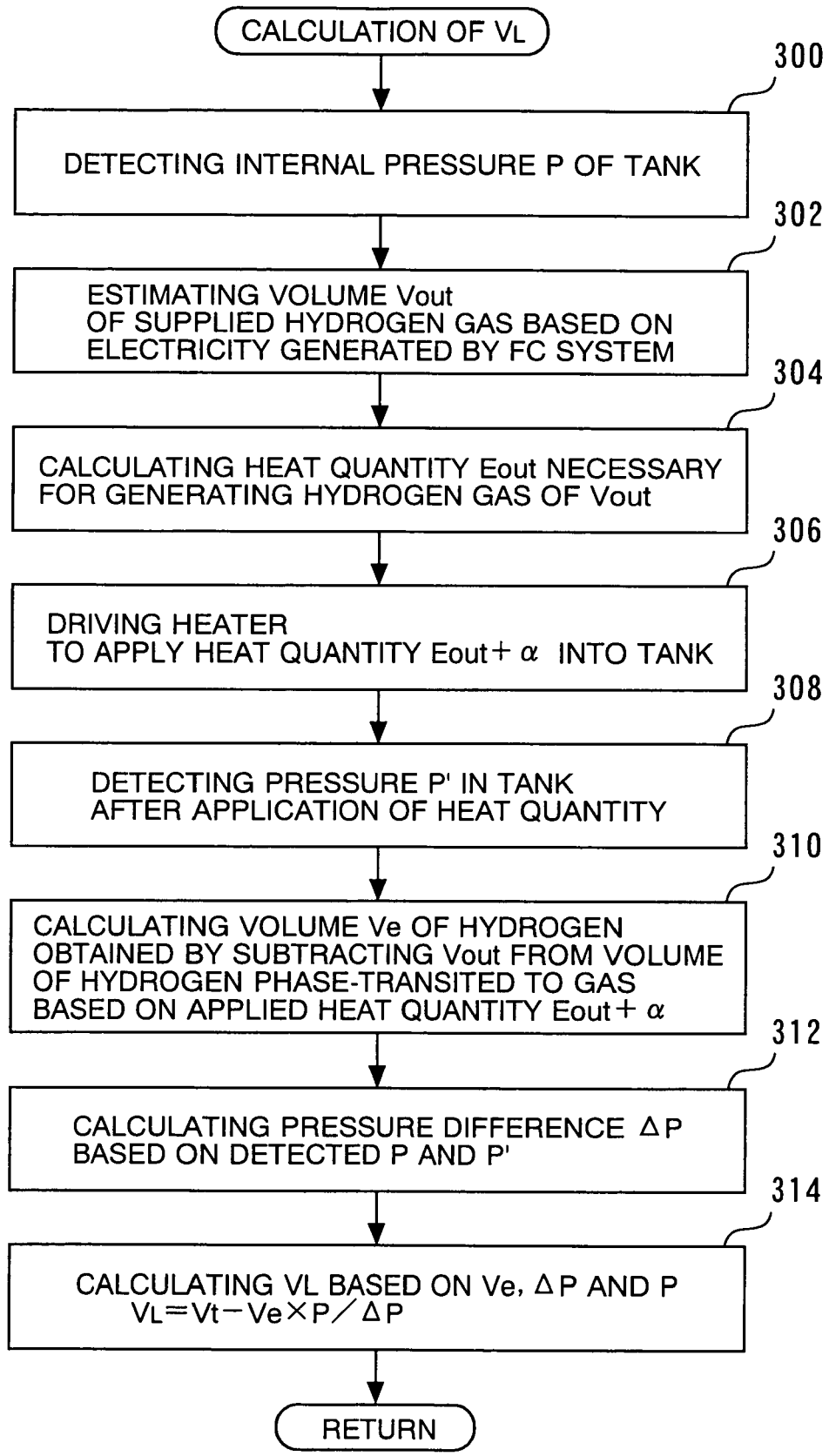
FIG. 6 is a flowchart for a routine executed by the system according to the third embodiment.

FIG. 6 is a flowchart for a routine executed by the ECU 16 to calculate the remaining quantity of liquid hydrogen in the tank. In the routine shown in FIG. 6, first, the internal pressure P of the tank is detected by the pressure sensor 12 provided in the tank 10 (Step 300). The detected output signal is supplied to the ECU 16.

Next, in the routine shown in FIG. 6, the volume Vout of hydrogen gas supplied to the FC system is calculated by the ECU 16 (Step 302). Specifically, the generated electricity information of the FC system is supplied to the ECU 16, and the necessary volume of hydrogen gas is estimated based on this signal etc.

Next, the heat quantity Eout necessary for generating the hydrogen gas Vout to be supplied is calculated (Step 304). Specifically, first, the evaporation latent heat Eg of hydrogen is specified. The evaporation latent heat Eg is a value that changes according to the pressure. The ECU 16 stores the map in which the relationship between the evaporation latent heat Eg and the pressure is specified. In this routine, by using this map, the evaporation latent heat Eg corresponding to the internal pressure of tank supplied by the pressure sensor 12 is specified. Then, based on the evaporation latent heat Eg and the temperature and pressure in the tank, the heat quantity Eout for generating hydrogen gas of the volume Vout is calculated.

Next, the heater 14 is driven by the ECU 16 to apply the heat quantity Eout+α obtained by adding the heat quantity α applied for detecting the remaining quantity of liquid to the calculated Eout into the liquid hydrogen (Step 306). After the heat quantity has been applied, some of the liquid hydrogen phase-transits to a gas, and on the other hand, the hydrogen gas of the volume Vout is discharged to the outside of tank, and is supplied to the FC system. The pressure sensor 12 detects the subsequent pressure P' (Step 308).

Next, in the routine shown in FIG. 6, the volume of hydrogen gas remaining in the tank is calculated by the ECU 16 (Step 310). Specifically, the value obtained by subtracting the volume Vout supplied to the FC system from the total volume of hydrogen gas phase-transited by the influence of the applied heat quantity is calculated as the value of the volume of hydrogen gas remaining in the tank.

After the processing in the above-described steps has been finished, the change amount ΔP of pressure in the tank before and after the application of heat quantity is calculated by the ECU 16 (Step 312). Then, the remaining quantity $V_L$ of liquid hydrogen in the tank is calculated (Step 314). In Steps 310 and 312, specifically, the processing that is the same as that in Steps 108 and 110 shown in FIG. 3 is executed.

As explained above, according to this embodiment, even during the operation of the FC system, the heat quantity Eout necessary for phase-transiting the supplied hydrogen gas and the heat quantity α applied for detecting the remaining quantity of liquid are applied, and the remaining quantity $V_L$ of liquid hydrogen in the tank is calculated based on the change amount of pressure in the tank before and after the application. Therefore, even during the operation of the FC system, the remaining quantity of liquid hydrogen can always be calculated accurately.

In the above-described third embodiment, the heat quantity Eout necessary for phase-transiting the supplied hydrogen gas and the heat quantity α applied for detecting the remaining quantity of liquid are applied, and the remaining quantity $V_L$ of liquid hydrogen in the tank is calculated based on the change amount of pressure in the tank before and after the application. However, the heat quantities used are not limited to those described above. That is to say, not only the heat quantities applied in Step 306 are used, but the leaking heat quantity shown in the second embodiment may be added, and the remaining quantity of liquid hydrogen may be calculated based on the change amount of pressure corresponding to the heat quantities.

Also, in the above-described third embodiment, even during the operation of the FC system for a hydrogen fuel vehicle etc., that is, even during the supply of hydrogen gas, the remaining quantity of liquid hydrogen can be calculated. However, the supply destination of hydrogen gas is not limited to the FC system. That is to say, the remaining quantity of liquid hydrogen may be calculated by acquiring the hydrogen gas supply amount from the hydrogen consumption (injection amount) etc. in any other engine etc. (hydrogen engine etc.) if the hydrogen gas supply amount can be acquired.

In the above-described third embodiment, the "heat quantity change amount acquiring means" in the first invention is realized by execution of processing in Step 306 using the ECU 16, the "pressure change amount acquiring means" in the first invention is realized by the execution of processing in Step 312 using the ECU 16, and the "liquid hydrogen remaining quantity calculating means" in the first invention is realized by the execution of processing in Step 314 using the ECU 16.

Also, in the above-described third embodiment, the "hydrogen gas supply amount acquiring means" in the second invention is realized by the execution of processing in Step 302 using the ECU 16.

Also, in the above-described third embodiment, the "heating means" in the fifth invention is realized by the execution of processing in Step 306 using the ECU 16.

Fourth Embodiment

Feature of Fourth Embodiment

Next, a fourth embodiment of the present invention is explained with reference to FIGS. 7 and 8. The system of this embodiment can be realized by the execution of the routine, described later, shown in FIG. 8 using the ECU 16 by using the hardware configuration shown in FIG. 1.

In the above-described second embodiment, the remaining quantity $V_L$ of liquid hydrogen in the tank is calculated based on the leaking heat quantity $E_L$ leaking naturally into the inside of tank and the change amount ΔP of pressure in the tank before and after the application. This leaking heat quantity $E_L$ is estimated based on the shape of tank and the temperature difference between the inside and outside of tank. However, the individual characteristics of each tank based on the variations in production cannot be reflected by the shape of tank only, so that the estimated leaking heat quantity has an error. Therefore, if this estimation error can be corrected, the remaining quantity of liquid hydrogen can be calculated more accurately.

Figure 7:
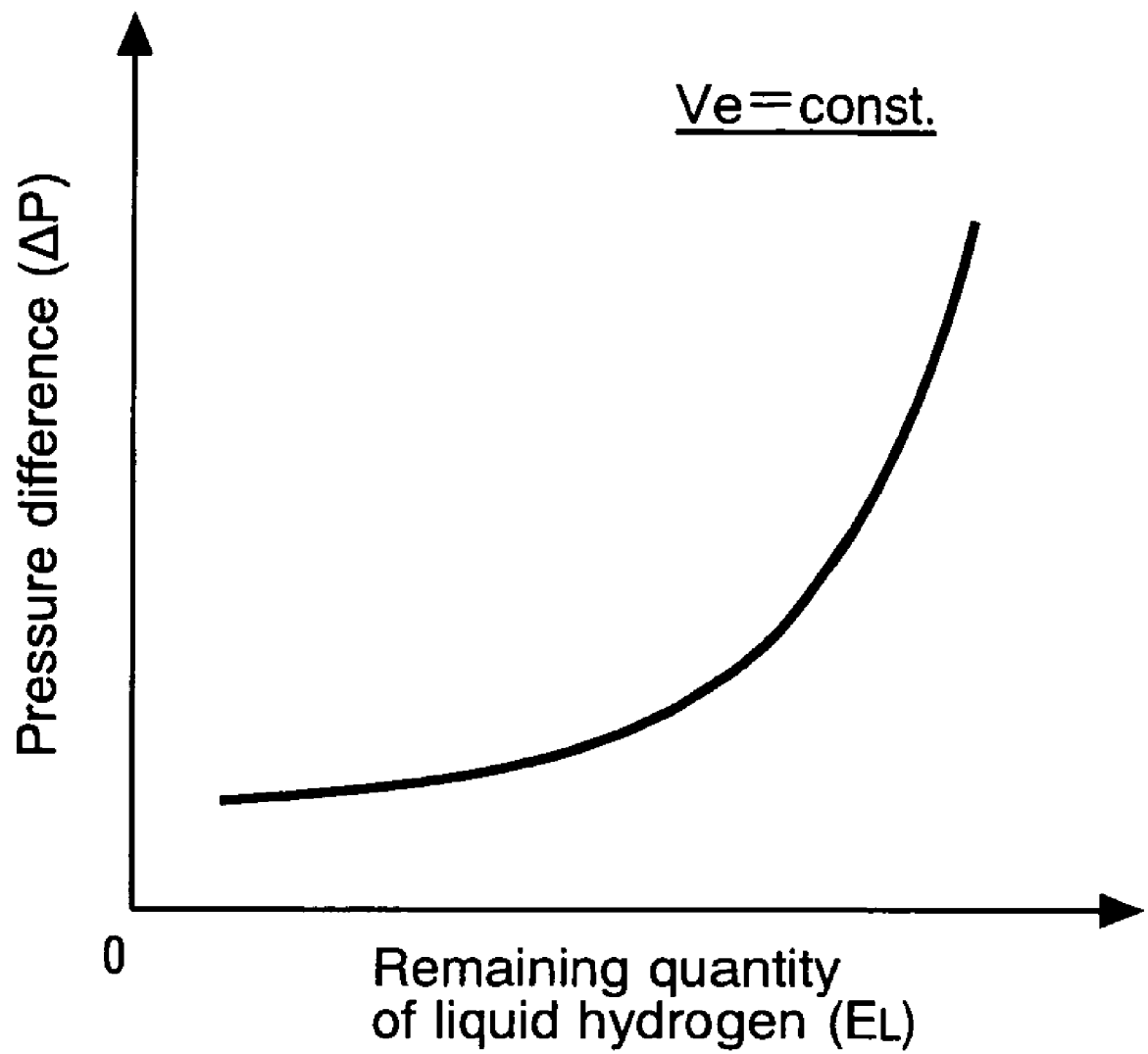
FIG. 7 is a graph showing the relationship between the change amount $\Delta P$ of pressure and the remaining quantity $V_L$ of liquid hydrogen in the tank.

FIG. 7 is a graph showing the relationship between the remaining quantity $V_L$ of liquid hydrogen and the change amount ΔP of pressure before and after phase transition in the case where hydrogen gas of the same volume Ve is generated. According to this figure, the change amount ΔP of pressure tends to take a larger value as the remaining quantity of liquid hydrogen increases, that is, as the volume of hydrogen gas in the tank decreases. Therefore, as the state in the tank becomes closer to a full-fill state, the change amount ΔP of pressure before and after the generation of Ve can be detected more accurately.

The leaking heat quantity $E_L$ is expressed as described below based on Equations (2) and (3).

$$E_L = Eg(Vt-V_L) \times \Delta P/RT \qquad (4)$$

Since $E_L$ can be calculated more accurately as the hydrogen gas volume $(Vt-V_L)$ decreases as described above, it is desirable to specify the liquid hydrogen volume $V_L$ close to full-fill. Therefore, $V_L$ at the full-fill time can be specified by using, for example, an over-filling sensor. That is to say, the over-filling sensor can exactly judge whether or not the liquid level has reached a predetermined position. Therefore, by installing this sensor in the tank 10, a specified volume of liquid hydrogen can be filled exactly.

As explained above, in this embodiment, the hydrogen gas volume $(Vt-V_L)$, Eg, ΔP and T are specified. By substituting these values into Equation (4), an exact leaking heat quantity in which the individual characteristics of each tank are reflected can be calculated.

Hereunder, a procedure for the system of this embodiment to calculate the remaining quantity $V_L$ of liquid hydrogen based on the above-described method is explained specifically.

Figure 8:
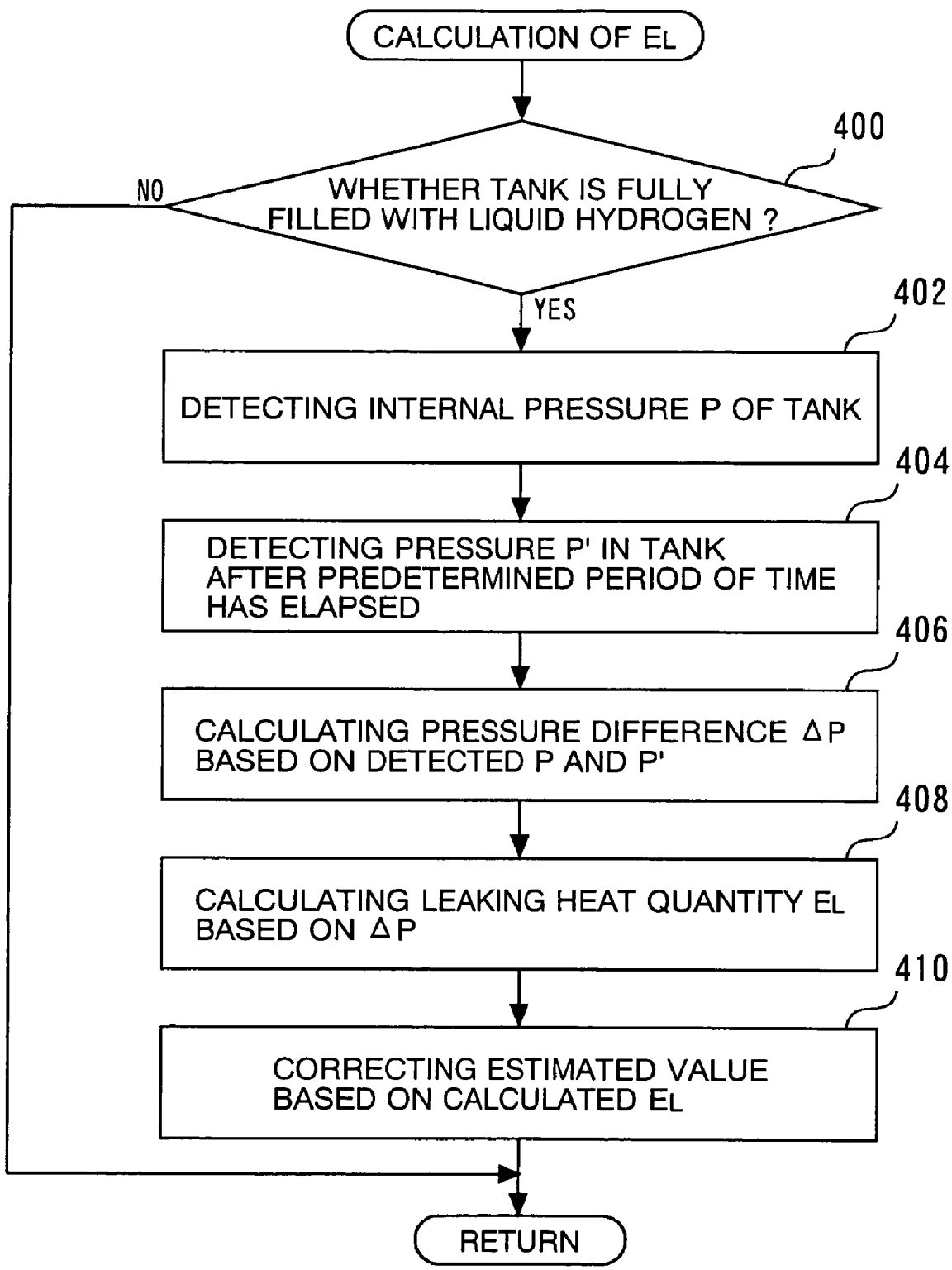
FIG. 8 is a flowchart for a routine executed by the system according to the fourth embodiment.

FIG. 8 is a flowchart for a routine executed by the ECU 16 to calculate the remaining quantity of liquid hydrogen in the tank. In the routine shown in FIG. 8, first, it is judged whether or not the liquid hydrogen has been fully filled into the tank 10 (Step 400). Specifically, this judgment is made based on the detection signal of the over-filling sensor installed in the tank. Thereby, it can be judged whether or not a specified empty volume has been formed in the tank. If the above-described condition is met, control proceeds to the next step, and if not, this routine is finished.

Next, in the routine shown in FIG. 8, the internal pressure P of the tank in the state in which liquid hydrogen is fully filled is detected (Step 402) by the pressure sensor 12 located in the tank 10. Then, the internal pressure P' of the tank after a predetermined period of time has elapsed is detected (Step 404). Thereafter, the change amount ΔP of pressure in the tank before and after the entrance of leaking heat quantity is calculated by the ECU 16 (Step 406). Specifically, processing in these steps are the same as that in Steps 200, 204 and 208 shown in FIG. 5. As described above, at the full-fill time, the change amount of pressure in the tank is large. Therefore, in Step 406, even if the leaking heat quantity is small, the change amount of pressure can be calculated accurately.

In the routine shown in FIG. 8, next, the leaking heat quantity $E_L$ leaking into the tank 10 is calculated by the ECU 16 (Step 408). Specifically, first, the evaporation latent heat Eg of hydrogen is specified. As described above, the evaporation latent heat Eg is a value that changes according to pressure. The ECU 16 stores a map in which the relationship between the evaporation latent heat Eg and the pressure is specified. In this routine, by using this map, the evaporation latent heat Eg corresponding to the internal pressure of tank supplied by the pressure sensor 12 is specified. Next, ΔP calculated in Step 406 and the temperature T in the tank are specified.

Next, in Step 408, the hydrogen gas volume $(Vt-V_L)$ is specified. As described above, the liquid hydrogen volume $V_L$ at the full-fill time can be specified exactly. Therefore, by subtracting $V_L$ from the tank volume Vt, $(Vt-V_L)$ is specified. By substituting these values into Equation (4), the leaking heat quantity $E_L$ is calculated by the ECU 16.

After the above-described steps have been finished, the leaking heat quantity used for the estimation of leaking heat quantity in Step 202 shown in FIG. 5 is replaced with $E_L$ calculated based on the actually measured value at the full-fill time in Step 408. Thereby, the routine shown in FIG. 8 is finished. Thereafter, by separately executing the routine shown in FIG. 5, the remaining quantity $V_L$ of liquid hydrogen in the tank in which $E_L$ calculated by this routine is reflected can be calculated.

As explained above, according to the system of this embodiment, the leaking heat quantity $E_L$ naturally leaking into the tank is calculated exactly based on the actually measured value at the full-fill time. Therefore, in the method for estimating the leaking heat quantity from the tank shape etc., consideration could not be made. The individual characteristics of each tank can be reflected, and the remaining quantity of liquid hydrogen can always be calculated accurately.

In the above-described fourth embodiment, the leaking heat quantity $E_L$ is calculated based on the hydrogen gas volume $(Vt-V_L)$ at the full-fill time specified by using the over-filling sensor. However, the tank filling state and the specifying method are not limited to those described in this embodiment. If the volume of hydrogen gas in the tank can be specified exactly, the tank filling state need not necessarily be a full-fill state, and any other specifying method can be used.

In the above-described fourth embodiment, the leaking heat quantity $E_L$ corresponds to the "heat transfer amount" in the seventh invention, and the "heat transfer amount estimating means" in the seventh invention is realized by the execution of processing in Step 408 using the ECU 16.

Also, in the above-described fourth embodiment, the "detecting means" in the ninth invention is realized by the execution of processing in Step 400 using the ECU 16, and the "pressure change amount acquiring means" in the ninth invention is realized by the execution of processing in Step 408 using the ECU 16.

The invention claimed is:

1. A system for detecting the remaining quantity of liquid hydrogen in a tank, comprising:
   means for applying a predetermined amount of energy, in the form of heat, to the liquid hydrogen in the tank, the means being located within the tank;
   means for acquiring the change amount of pressure in the tank before and after the predetermined amount of energy is applied to the liquid hydrogen in the tank; and means for calculating the remaining quantity of liquid hydrogen in the tank using the predetermined amount of energy applied by the applying means and the change amount of pressure, wherein the predetermined amount of energy is based on an amount of energy necessary to phase-transition some of the liquid hydrogen in the tank to a gas.

2. The system for detecting the remaining quantity of liquid hydrogen according to claim 1, further comprising:
   means for supplying hydrogen gas to the outside of the tank; and
   means for acquiring the supply amount of hydrogen gas supplied by the hydrogen gas supplying means, wherein the liquid hydrogen remaining quantity calculating means calculates the remaining quantity of liquid hydrogen in the tank based on the predetermined amount of energy, the change amount of pressure, and the supply amount of hydrogen gas.

3. The system for detecting the remaining quantity of liquid hydrogen according to claim 2, wherein
   the hydrogen gas supplying means supplies hydrogen gas to an output device which uses hydrogen as a fuel, and
   the hydrogen gas supply amount acquiring means estimates the supply amount of hydrogen gas based on the hydrogen consumption in the output device.

4. The system for detecting the remaining quantity of liquid hydrogen according to claim 2, wherein
   the hydrogen gas supplying means supplies hydrogen gas to a fuel cell which uses hydrogen as a fuel, and
   the hydrogen gas supply amount acquiring means estimates the supply amount of hydrogen gas based on the electricity generated by the fuel cell.

5. The system for detecting the remaining quantity of liquid hydrogen according to claim 1, wherein
   the energy applying means is a heater arranged in the tank.

6. The system for detecting the remaining quantity of liquid hydrogen according to claim 1, further comprising:
   means for estimating the heat transfer amount from the outside to the inside of the tank and for acquiring the heat transfer amount as the predetermined amount of energy.

7. The system for detecting the remaining quantity of liquid hydrogen according to claim 6, further comprising means for acquiring the temperature difference between the inside and the outside of the tank, wherein
   the heat transfer amount estimating means estimates the heat transfer amount so as to be larger as the temperature difference increases.

8. The system for detecting the remaining quantity of liquid hydrogen according to claim 7, further comprising:
   means for detecting that the quantity of liquid hydrogen in the tank has reached a specified quantity; and
   means for acquiring the change amount of pressure in the tank for a predetermined period of time in the case where the tank is filled with the specified quantity of liquid hydrogen, wherein
   the heat transfer amount estimating means estimates the heat transfer amount based on the specified quantity and the change amount of pressure in the case where the tank is filled with the specified quantity of liquid hydrogen.

9. The system for detecting the remaining quantity of liquid hydrogen according to claim 8, wherein
   the specified quantity is close to the full-fill quantity of the tank.

10. A method for detecting the remaining quantity of liquid hydrogen in a tank, comprising the steps of:
    applying a predetermined amount of energy, in the form of heat, to the liquid hydrogen in the tank through the use of a heating device located within the tank;

acquiring the change amount of pressure in the tank before and after the applying the predetermined amount of energy to the liquid hydrogen in the tank;

and calculating the remaining quantity of liquid hydrogen in the tank using the predetermined amount of energy and the change amount of pressure, wherein the predetermined amount of energy is based on an amount of energy necessary to phase-transition some of the liquid hydrogen in the tank to a gas.

11. The method for detecting the remaining quantity of liquid hydrogen according to claim 10, further comprising the steps of:

supplying hydrogen gas to the outside of the tank; and acquiring the supply amount of hydrogen gas supplied by the hydrogen gas supplying step, wherein the liquid hydrogen remaining quantity calculating step calculates the remaining quantity of liquid hydrogen in the tank based on the predetermined amount of energy, the change amount of pressure, and the supply amount of hydrogen gas.

12. The method for detecting the remaining quantity of liquid hydrogen according to claim 10, further comprising:

a step of estimating the heat transfer amount from the outside to the inside of the tank and of acquiring the heat transfer amount as the predetermined amount of energy.

13. The method for detecting the remaining quantity of liquid hydrogen according to claim 12, further comprising the steps of:

detecting that the quantity of liquid hydrogen in the tank has reached a specified quantity; and acquiring the change amount of pressure in the tank for a predetermined period of time in the case where the tank is filled with the specified quantity of liquid hydrogen, wherein the heat transfer amount estimating step estimates the heat transfer amount based on the specified quantity and the change amount of pressure in the case where the tank is filled with the specified quantity of liquid hydrogen.

14. A system for detecting the remaining quantity of liquid hydrogen in a tank, comprising:

a device for applying a predetermined amount of energy, in the form of heat, to the liquid hydrogen in the tank, the device being located within the tank;

a device for acquiring the change amount of pressure in the tank before and after the predetermined amount of energy is applied to the liquid hydrogen in the tank;

and a device for calculating the remaining quantity of liquid hydrogen in the tank using the predetermined amount of energy and the change amount of pressure, wherein the predetermined amount of energy is based on an amount of energy necessary to phase-transition some of the liquid hydrogen in the tank to a gas.

* * * * *